(12) United States Patent
Gamble et al.

(10) Patent No.: US 8,561,382 B2
(45) Date of Patent: Oct. 22, 2013

(54) MOWER WITH CUSHIONED SUSPENSION FOR OPERATOR SUPPORT PLATFORM HAVING STOWED AND DEPLOYED POSITIONS

(75) Inventors: Jesse R. Gamble, Burnsville, MN (US); David J. Scherbring, Savage, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/002,798

(22) Filed: Dec. 18, 2007

(65) Prior Publication Data

US 2008/0196374 A1 Aug. 21, 2008

Related U.S. Application Data

(60) Provisional application No. 60/875,749, filed on Dec. 19, 2006.

(51) Int. Cl.
*A01D 34/00* (2006.01)

(52) U.S. Cl.
USPC .......................................................... 56/14.7

(58) Field of Classification Search
USPC ............... 56/14.7, 14.9, 15.4, 16.7; 180/180; 280/32.7, 32.5, 163
See application file for complete search history.

(56) References Cited

U.S. PATENT DOCUMENTS

| | | | | |
|---|---|---|---|---|
| 2,657,408 A * | 11/1953 | Machovec | .......................... | 15/83 |
| 3,485,314 A * | 12/1969 | Herr | .............................. | 180/19.1 |
| 3,605,929 A * | 9/1971 | Rolland | ......................... | 180/208 |
| 3,672,722 A * | 6/1972 | Murcott | .................... | 297/423.38 |
| 4,096,920 A * | 6/1978 | Heyn | ............................... | 180/11 |
| 4,325,565 A * | 4/1982 | Winchell | ....................... | 280/282 |
| RE32,031 E * | 11/1985 | Winchell | ....................... | 280/282 |
| 4,878,339 A * | 11/1989 | Marier et al. | ................... | 56/14.7 |
| 5,118,123 A * | 6/1992 | Betrock | ........................ | 280/32.7 |
| 5,564,721 A * | 10/1996 | Wians | .......................... | 280/32.7 |
| 5,653,466 A * | 8/1997 | Berrios | .......................... | 280/760 |
| 5,697,623 A * | 12/1997 | Bermes et al. | ............... | 280/32.7 |
| 5,809,756 A | 9/1998 | Scag et al. | | |
| 5,810,371 A * | 9/1998 | Velke | ........................... | 280/32.7 |
| 5,813,679 A * | 9/1998 | Hobrath | ........................ | 280/32.7 |
| 5,873,589 A * | 2/1999 | Hallett | ........................ | 280/250.1 |

(Continued)

OTHER PUBLICATIONS

Auburn Consolidated Industries, Inc., Great Dane Surfer Operator's Manual, Dec. 18, 2006, pp. 44, 54, 55, 62.*

(Continued)

*Primary Examiner* — Thomas B Will
*Assistant Examiner* — Joan D Misa
(74) *Attorney, Agent, or Firm* — James W. Miller

(57) ABSTRACT

A stand-on riding mower has a support platform at the rear thereof for supporting an operator who stands during operation of the mower. The support platform is pivotally connected to the traction frame of the mower by a suspension that includes pivotal support plates at each side of the platform. At least one spring is arranged to push against the pivotal support plates in a direction causing the platform to rise such that the weight of the operator atop the platform causes the platform to lower until increasing biasing force in the spring balances the operator's weight. The spring ensures that impact shocks and the like on the traction frame of the mower are cushioned before reaching the operator's platform. In addition, the operator's platform is pivotal relative to the support plates to allow the operator's platform to be disposed in both a vertical stowed position and a horizontal deployed position.

1 Claim, 6 Drawing Sheets

(56) References Cited

U.S. PATENT DOCUMENTS

| | | | |
|---|---|---|---|
| 5,996,716 A * | 12/1999 | Montiglio et al. | 180/65.51 |
| 6,062,582 A * | 5/2000 | Martin | 280/493 |
| 6,322,151 B2 * | 11/2001 | Dombek et al. | 298/1 C |
| 6,327,839 B1 * | 12/2001 | Velke et al. | 56/14.7 |
| 6,485,036 B1 * | 11/2002 | Bricko | 280/32.7 |
| 6,490,849 B1 * | 12/2002 | Scag et al. | 56/16.7 |
| 6,497,422 B1 * | 12/2002 | Bellis, Jr. | 280/32.7 |
| 6,499,282 B1 * | 12/2002 | Velke et al. | 56/14.7 |
| 6,782,964 B1 | 8/2004 | Korthals | |
| 7,458,588 B2 * | 12/2008 | Kallevig | 280/32.7 |
| 7,467,677 B2 * | 12/2008 | Barrier | 180/6.48 |
| 2004/0145134 A1 * | 7/2004 | Bares | 280/32.7 |
| 2005/0183409 A1 * | 8/2005 | Barrier | 56/11.9 |

OTHER PUBLICATIONS

Auburn Consolidated Industries, Inc., EverRide Scorpion FX Operator's Manual, Mar. 30, 2007, pp. 54-55.

Auburn Consolidated Industries, Inc., EverRide Scorpion FX Product Announcement, Oct. 5, 2006.

* cited by examiner

MOWER WITH CUSHIONED SUSPENSION FOR OPERATOR SUPPORT PLATFORM HAVING STOWED AND DEPLOYED POSITIONS

CROSS REFERENCE TO RELATED APPLICATIONS

This application claims the benefit of one or more previously filed provisional applications identified as follows: Application Ser. No. 60/875,749 filed Dec. 19, 2006.

TECHNICAL FIELD

This invention relates to a mower that is operated by an operator who is supported in a standing position by a support platform.

BACKGROUND OF THE INVENTION

Various lawn mowers are known having a traction frame propelled by a pair of drive wheels. The drive wheels are independently driven by separate drive motors capable of both forward and reverse operation. A very sharp turn can be executed by operating one drive wheel in a forward direction while simultaneously operating the other drive wheel in a reverse direction. Such mowers are often referred to as skid steer mowers or zero radius turn mowers or the like.

In some mowers of this type, the operator is carried at the rear of the mower atop a support platform on which the operator stands. In a further subset of these mowers, the support platform is fixed to the traction frame in an essentially rigid fashion. Thus, the support platform is subjected to the same bumps and shocks experienced by the traction frame as the mower is driven over the ground. Since the traction frame of such a mower is not usually cushioned to provide a soft ride, the bumps or shocks encountered by the mower are transmitted through to the support platform largely unabated.

Consequently, the ride experienced by the operator who stands on the support platform can be quite rough particularly when the mower is operating over uneven terrain. This can be uncomfortable and annoying to the operator. Moreover, it can be difficult for the operator to keep his or her balance on the support platform which is a distraction for the operator. Thus, the use of a rigidly supported platform on the traction frame can potentially interfere with the safe operation of the mower and certainly makes the task of operating the mower more tiring for the operator.

Some mowers with an operator support platform attempt to improve the ride for the operator by using a plurality of springs between the support platform and the frame. The springs push up on the support platform and are depressed when the operator steps onto the support platform. However, in known mowers of this type, the amount of travel allowed for the support platform is very small, e.g. about ½". Thus, there will be times when the support platform bottoms out and the operator is still subjected to shocks and bumps encountered by the mower.

SUMMARY OF THE INVENTION

One aspect of this invention relates to an improved mower of the type having a traction frame which is self propelled by at least one drive wheel, a cutting deck for mowing grass carried on the traction frame, and an operator platform which has at least a substantially horizontal deployed position in which an operator is able to stand atop the platform while operating the mower. The improvement relates to a suspension for the operator platform which comprises a suspension interposed between the operator platform and the traction frame with the suspension carrying the operator platform. The suspension has at least one resilient member for absorbing and at least partially attenuating impact shocks to decrease the impact of such shocks at the operator platform.

Another aspect of this invention relates to a stand-on riding mower which comprises a traction frame supported by a plurality of wheels for rolling over the ground. A cutting deck is carried on the traction frame. A support platform supports an operator who stands during operation of the mower. A suspension carries the support platform at the rear of the traction frame. The suspension comprises at least one pivotal support connected to the traction frame with the support platform being carried by the pivotal support. At least one resilient biasing device biases the pivotal support in a direction causing the platform to rise relative to the traction frame such that the weight of an operator atop the platform causes the platform to lower until an increasing biasing force in the resilient biasing device balances the operator's weight.

Yet another aspect of this invention relates to an improved mower of the type having a traction frame which is self propelled by at least one drive wheel, a cutting deck for mowing grass carried on the traction frame, and an operator platform which has at least a substantially horizontal deployed position in which an operator is able to stand atop the platform while operating the mower. The improvement relates to a platform having a floor which comprises a substantially flat, central portion bounded on either side by an inclined ramp whose height progressively increases as one proceeds laterally outwardly.

An additional aspect of this invention relates to a mower of the type set forth in the preceding paragraph. The improvement relates to a platform having a floor with a substantially flat, central portion shaped to progressively increase in width from back to front.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
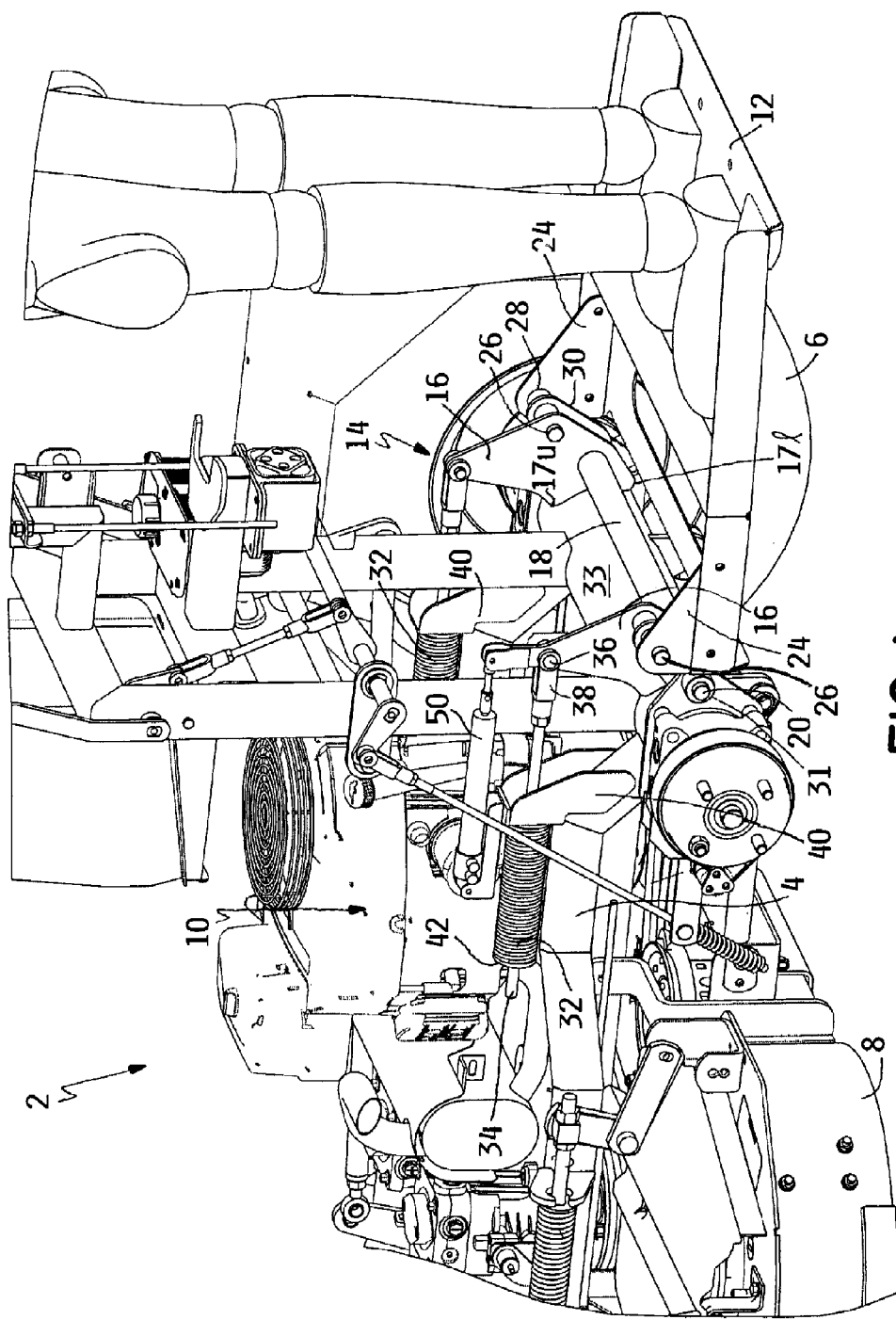
FIG. 1 is a perspective view of a portion of a mower according to this invention, particularly illustrating the cushioned suspension of this invention with the operator support platform in a substantially horizontal, deployed position.

One embodiment of a mower according to this invention is illustrated generally as 2. Only the rear of mower 2 is illustrated since this is the portion of mower 2 that carries the improvement of this invention.

Mower 2 comprises a traction frame 4 that is propelled over the ground by a pair of rear drive wheels 6. See FIG. 6. Only drive wheel 6 on the far side of mower 2 is shown in FIGS. 1-4 with drive wheel 6 on the near side of mower 2 having been removed for the purpose of clarity. Drive wheels 6 are independently powered for forward and reverse operation by separate drive motors (not shown). Thus, mower 2 is capable of skid steer or zero radius turn operation.

The front of traction frame 4 carries a pair of unpowered caster wheels (not shown). A cutting deck 8 for mowing grass is suspended beneath a portion of traction frame 4 between the front caster wheels and rear drive wheels 6. Cutting deck 8 has one or more rotary cutting blades (not shown). Mowers 2 of this general type are well known in the mower art.

This invention relates to a cushioned suspension, indicated generally as 10, for an operator support platform 12. Suspension 10 and platform 12 are located at the rear of traction frame 4. Suspension 10 provides a cushioned and more comfortable ride for an operator who stands atop platform 12 when platform 12 is in a substantially horizontal, deployed position shown in FIGS. 1-3. In addition, platform 12 is itself pivotally mounted on suspension 10 to allow platform 12 to also be placed in a substantially vertical, stowed position shown in FIG. 4.

Suspension 10 comprises a U-shaped suspension cradle 14 formed by a pair of laterally spaced support plates 16 that are fixed to a crosstube 18. A transverse pivot axle or shaft 20 is fixed to the rear of traction frame 4. Pivot shaft 20 passes through crosstube 18 to rotatably journal cradle 14 on traction frame 4. Thus, cradle 14 is free to rock back and forth relative to traction frame 4 about a first substantially horizontal pivot axis $x_1$ defined by the axis of pivot shaft 20, as shown by the arrows A and B in FIG. 2.

Platform 12 is itself suspended from cradle 14 by a pair of laterally spaced, upwardly extending mounting ears 24 fixed to the front of platform 12. Each mounting ear 24 is suspended from cradle 14 by a pair of pivot pins 26 that are aligned with one another along a common axis. Thus, platform 12 can pivot relative to cradle 14 about a second substantially horizontal pivot axis $x_2$ defined by the aligned axes of pivot pins 26, as shown by the arrows C and D in FIG. 2.

Figure 5:
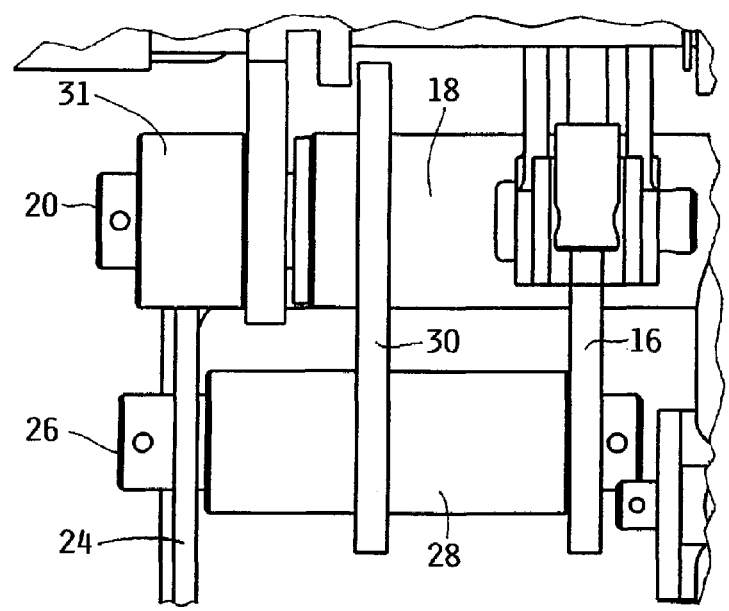
FIG. 5 is a partial top plan view of a portion of the cushioned suspension of this invention.

Referring to FIG. 5, each pivot pin 26 is long enough to span between and pass through a mounting ear 24 and the support plate 16 adjacent to that mounting ear 24. Thus, each mounting ear 24 and support plate 16 are pivotally received on opposite ends of each pivot pin 26. In addition, each pivot pin 26 is supported by a transverse hub or spacer 28 that spans the distance between mounting ear and support plate 16. Hub or spacer 28 is also additionally supported by an intermediate link arm 30 placed between mounting ear 24 and support plate 16. The lower end of link arm 30 is fixed to crosstube 18 and the upper end of link arm 30 is fixed to hub or spacer 28.

Figure 2:
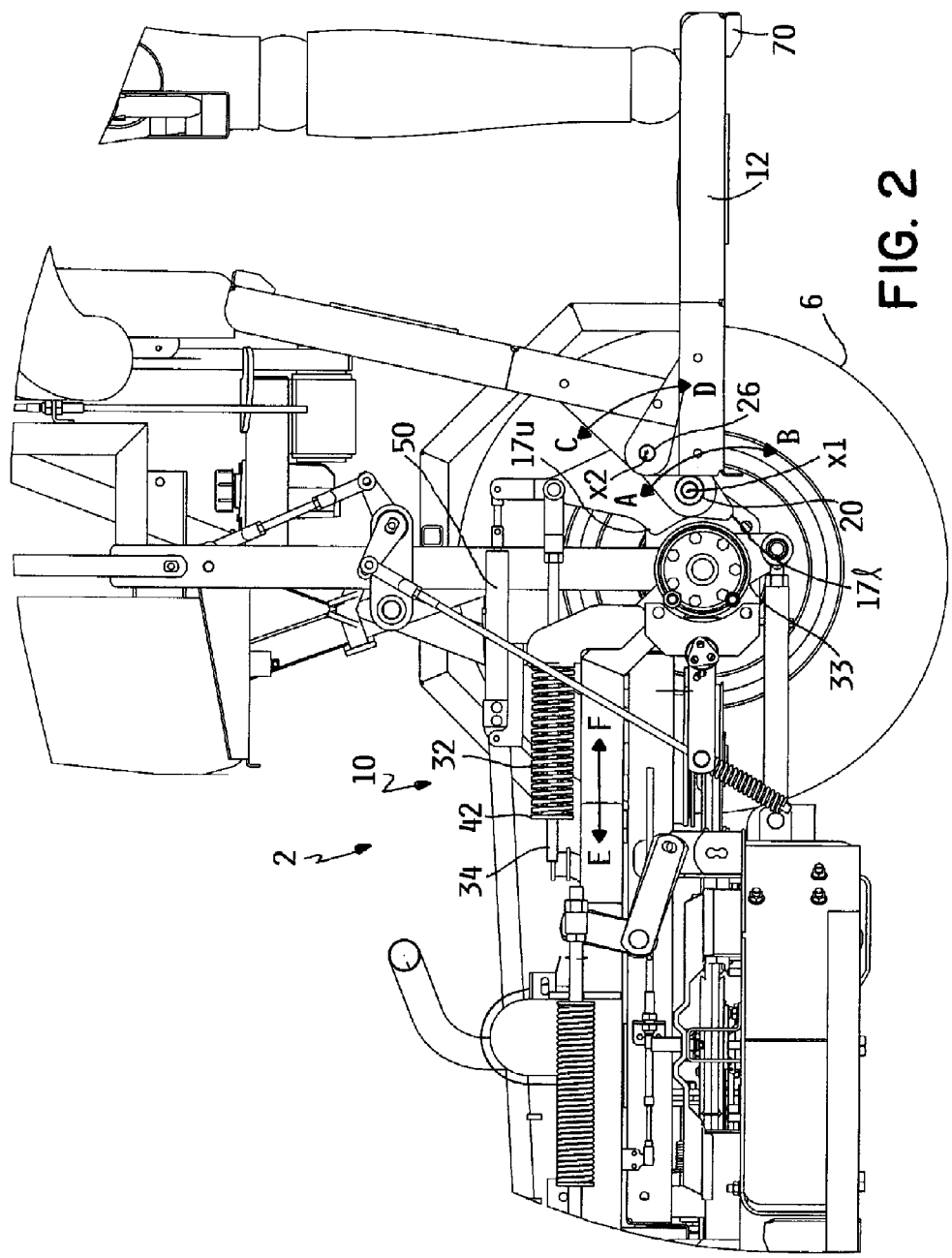
FIG. 2 is a side elevational view of the portion of the mower shown in FIG. 1, with an additional portion of the mower removed to show the suspension in a centered state relative to a fixed stop in the form of a cylindrical crossmember on the traction frame.
Figure 3:
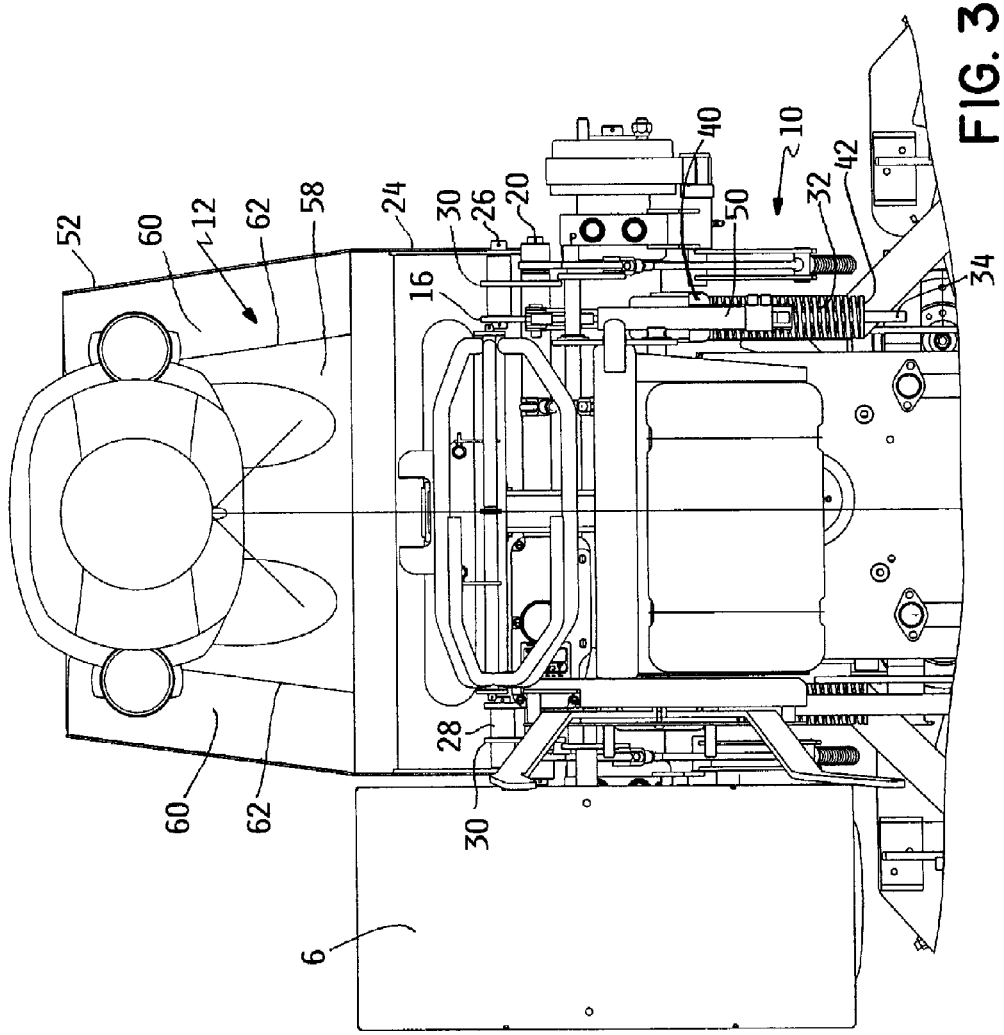
FIG. 3 is a top plan view of the portion of the mower shown in FIG. 1.
Figure 4:
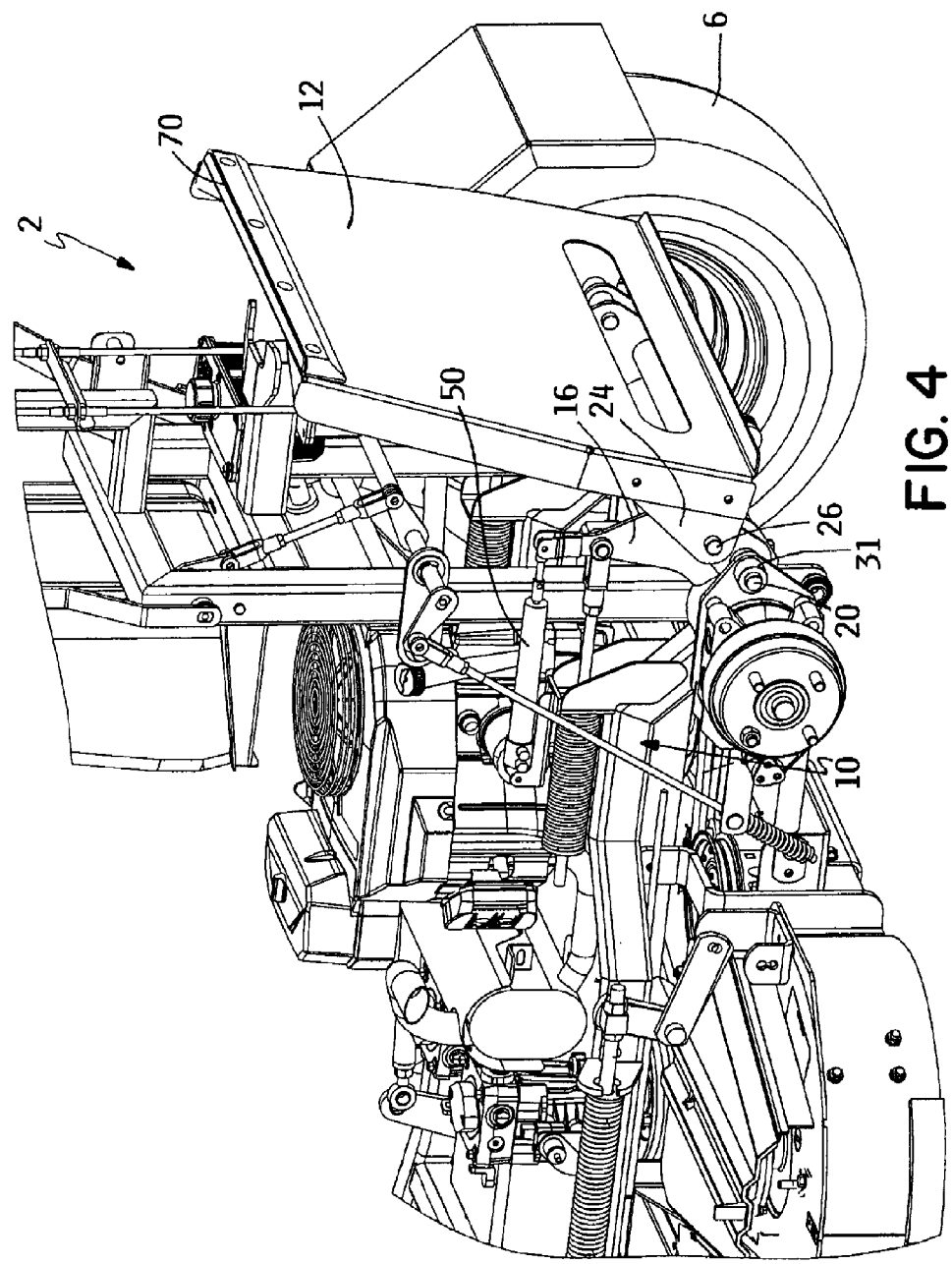
FIG. 4 is a perspective view similar to FIG. 1, but showing the operator support platform in a substantially vertical, stowed position.

Referring to FIGS. 1-3, the deployed position of platform 12 is one in which platform 12 is disposed in a substantially horizontal position behind rear drive wheels 6. In the deployed position, the operator is able to stand atop platform 12 while operating mower 2 using controls (not shown) located at rear of traction frame 4. Referring to FIG. 4, the stowed position of platform 12 is one in which platform 12 is disposed in a substantially vertical position in which platform 12 is substantially upright adjacent the rear of mower 2. A catch or lock (not shown) is provided for latching platform 12 in the stowed position thereof.

Platform 12 pivots on suspension 10 about second substantially horizontal pivot axis $x_2$ in moving back and forth between the deployed and stowed positions as shown by the arrows C and D in FIG. 2. This pivoting is done manually by the operator with the operator manually lifting platform 12 to move it up into the stowed position. After the platform catch or lock is released, platform 12 will pivot under the force of gravity to its deployed position and gravity will keep platform 12 in its deployed position. The operator could also manually retard or slow the downward motion of platform 12 by keeping a hand under platform 12 as gravity pivots platform 12 downwardly. In the deployed position of platform 12, the front side of each ear 24 rests against a rotatable cushion or bumper 31 contained on the outer ends of pivot axle or shaft 20.

Suspension 10 includes a pair of compression springs 32 acting between traction frame 4 and support plates 16 of cradle 14. Compression springs 32 are identically arranged between traction frame 4 and support plates 16. Thus, a description of one compression spring 32 in relation to its corresponding support plate 16 will suffice to describe the other compression spring 32 as well.

Support plate 16 includes a forwardly extending rod 34 pivotally connected to the top of support plate 16 rod by a pin 36 and a clevis 38. Rod 34 passes through a bracket 40 on the rear of traction frame 4 and extends some distance forwardly of bracket 40. Spring 32 is also placed ahead of bracket 40. Spring 32 concentrically surrounds rod 34 and is shorter than the length of that portion of rod 34 extending forwardly of bracket 40.

The rear end of spring 32 bears against bracket 40. The front end of spring 32 bears against a washer 42 that is adjustably held in place on rod 34 by a threaded nut (not shown). The nut can be moved back and forth along rod 34 to adjust the compression of spring 32. Spring 32 pushes forwardly on rod 34 in the direction of arrow E in FIG. 2 so as to rotate support plate in the direction of arrow A to thereby rotate platform 12 in the direction of arrow C.

When platform 12 is in its deployed position and the operator is not standing on platform 12, springs 32 act on platform 12 in a direction that causes platform 12 to lift or rise relative to traction frame 4. This lift or rise of platform 12 will continue until such time as an upper nose $17_u$ on each support plate 16 engages against the top of a fixed cylindrical crossmember 33 on traction frame 4. See FIG. 2. This will be the usual or unloaded state of platform 12 when platform 12 is in its deployed position but no operator is standing on platform 12. Platform 12 will be somewhat lifted relative to traction frame 4, plates 16 will be rotated about pivot axis $x_1$ in the direction of arrow A, and the upper noses $17_u$ on support plates 16 will be resting against the stop formed by fixed crossmember 33.

When the operator stands on platform 12 and applies his or her weight thereto, platform 12 and support plates 16 will each rotate in the directions B and D shown in FIG. 2. Each rod 34 is pulled rearwardly in the direction of the arrow F in FIG. 2, thus compressing each spring 32 between washer 42 carried adjacent the front end of spring 32 and the corresponding bracket 40. This compression continues until the combined biasing force of springs 32 balances out the weight of the operator on platform 12. If springs 32 are properly adjusted, this will happen before a lower nose $17_l$ on support plates 16 engages against fixed crossmember 33, which serves to stop out motion of suspension 10 in the direction of arrow B in FIG. 2.

Springs 32 are desirably preloaded to adjust the amount of biasing force they provide by using the nut to move or adjust the position of washer 42 along rod 34. The amount of the preload is selected in relation to the weight of the operator such that support plates 16 are preferably centered relative to fixed crossmember 33 when the operator is standing atop platform 12. The centered relationship of support plates 16 is one in which both upper nose $17_u$ and lower nose $17_l$ are roughly equidistant from fixed crossmember 33 as shown in FIG. 2. Note in FIG. 2 that both upper nose $17_u$ and lower nose $17_l$ are spaced by a similarly sized gap from crossmember 33. This provides substantially equal travel to suspension 10 in directions A and B as the mower is operated. Preferably, this travel is on the order of 2" or so in each direction for a total travel of 4".

As mower 2 is driven over the ground, platform 12 is free to rock up and down about pivot axis $x_1$ as mower 2 encounters various undulations in the terrain, at least until either of the noses $17_u$ or $17_l$ hits crossmember 33 at the end of the designed range of travel. But before the motion of suspension 10 is so stopped out, the ride experienced by the operator is cushioned by springs 32 contained in suspension 10. Impact shocks and the like are absorbed and at least partially attenuated by suspension 10 and are not fully transmitted through to platform 12. Thus, it is much more comfortable for the operator to stand atop platform 12 and to operate mower 2 than the rigidly affixed platforms of the prior art. The maximum range of travel of suspension 10, on the order of 4" or so, is large enough so that the motion of suspension 10 will not be stopped out except perhaps only very occasionally.

An adjustable gas or hydraulic dampener 50 is also pivotally attached between traction frame 4 and at least one support plate 16. The purpose of dampener 50 is to slow the rate of motion of platform 12 about pivot axis $x_1$. This further improves the ride for the operator by dampening and slowing any oscillatory movement of platform 12 about axis $x_1$ that might occur as mower 4 is being driven. One dampener 50 will be sufficient. Moreover, the use of dampener 50 is optional As noted above, the pivotal cushioned suspension 10 provides a more comfortable ride for an operator who is standing on platform 12. However, platform 12 is itself pivotally mounted on suspension 10 to allow platform 12 to be conveniently placed in either a deployed or stowed position relative to mower 2. This is done merely by pivoting platform 12 about pivot axis $x_2$ carried on suspension 10. When platform 12 is in its stowed position, the front to back length of mower 2 is decreased to allow for more convenient transport on a trailer or more compact storage. This is also an advantage.

Figure 6:
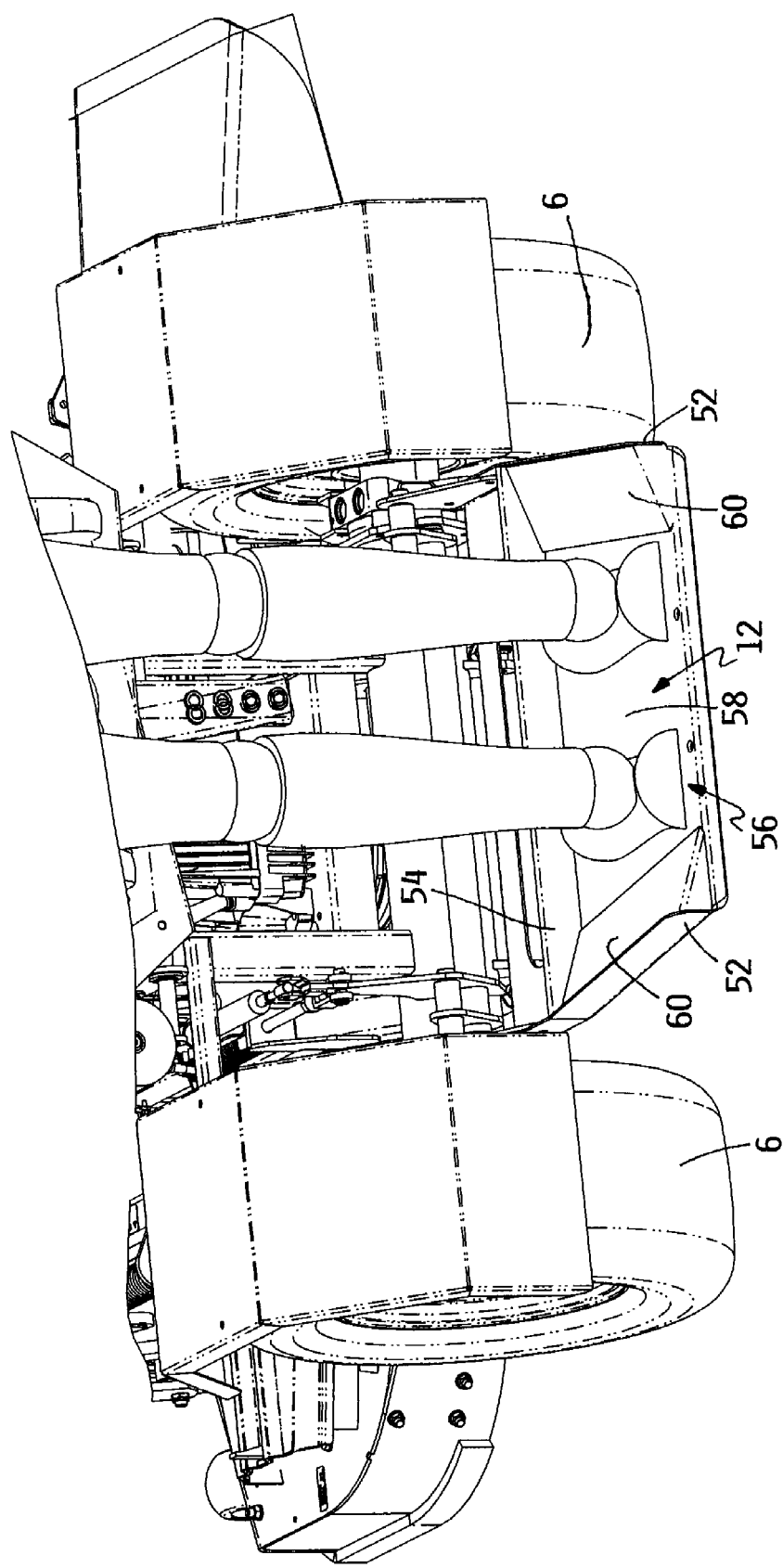
FIG. 6 is a rear perspective view of the portion of the mower shown in FIG. 1, particularly illustrating the operator support platform.

Referring now to FIGS. 3 and 6, platform 12 has spaced upwardly extending side walls 52 bounded by an upwardly extending front wall 54. The rear of platform 12 is open without any type of upwardly extending rear wall to permit the operator to more easily step up onto or step down off of platform 12. A floor 56 extends between side walls 52 behind front wall 54. The operator can stand atop platform 12 by standing on floor 56.

Floor 56 is not planar over its entire area. Floor 56 has a planar, flat central portion 58 that occupies most of the area of floor 56. In addition, floor 56 has a pair of tilted ramps 60 on each side of central portion 58. Ramps 60 fill in or occupy the remaining area of floor 56.

Each ramp 60 has a triangular cross-section such that each ramp 60 progressively gets higher as ramp 60 extends laterally outwardly. The inner side of ramp 60 feathers down into central portion 58 of floor 56 to be flush with central portion 58 of floor 56. The outer side of ramp 60 is about as high as side wall 52 of floor 56.

In addition, as shown in FIG. 3, the inner sides 62 of ramps 60 are not parallel to one another or parallel to a straight fore-and-aft direction. Instead, inner sides 62 of ramps 60 progressively spread apart as one proceeds from the rear of platform 12 towards the front of platform 12, i.e. towards front wall 54. Accordingly, the flat central portion 58 of floor 56 is not square or rectangular, but is a trapezoid whose lateral sides diverge outwardly as one proceeds from the back to the front.

The laterally diverging area of the flat central portion 58 of floor 56, formed by the laterally diverging inner sides 62 of ramps 60, echoes or mimics the natural orientation of the operator's feet when the operator is standing on platform 12. Most people stand with their feet spread apart but with their feet slightly pointed or tilted to the outside. In other words, when most people stand, the person's right foot normally points slightly to the right and the left foot normally points slightly to the left. The diverging shape of the flat central portion 58 is meant to mimic this shape to form a space in which the user will more naturally place his or her feet. Thus, the user will find it easier to stand on platform 12 in a centered position and in a natural fashion.

In addition, the inclination of ramps 60 is meant to provide a generally horizontal foot pad when the mower is being operated on a sidehill. When this occurs, the entire platform 12, indeed the entire mower 2, is tilted at an angle generally corresponding to the angle of the sidehill. However, in this situation, the top surface of ramp 60 on the downhill side of platform 12 will now be generally horizontal. Thus, when operating on a sidehill, the operator can shift his or her downhill foot from the flat central portion 59 and place such foot atop the downhill ramp 60. This allows the operator to stand with the downhill foot atop the downhill ramp 60 much more easily than if ramp 60 were not present. This makes platform 12 more comfortable to ride on a sidehill.

If desired, platform 12 can include a plastic wear strip 70 on the underside thereof. As shown in FIGS. 2 and 4, such a wear strip 70 is located along the underside of the rear edge of floor 56 of platform 12. This wear strip 70 will prevent wear or damage to platform 12 if platform 12 should strike an obstacle, such as when mower 2 is being driven up over a curb or the like.

Various modifications of this invention will be apparent to those skilled in the art. Many different types of springs or other resilient biasing devices could be used. For example, tension or torsion springs could be substituted for compression springs 32 and elastomeric biasing devices could be used in place of springs. Where the springs are located and how they interact with suspension 10 can all be varied, though it is desired that the biasing force be applied in a direction that causes platform 10 to rise or lift relative to traction frame 4 when platform 10 is in its deployed position by is not loaded with the weight of the operator.

Accordingly, this invention is to be limited only by the appended claims.

We claim:

1. An improved mower of the type having a traction frame which is self propelled by a pair of laterally spaced rear drive wheels, a cutting unit for mowing grass carried on the traction frame, and an operator platform which has at least a substantially horizontal deployed position located entirely above and out of contact with the ground in which an operator is able to stand atop the platform to operate the mower, wherein the improvement relates to the operator platform, which comprises:

a platform having an operator supporting floor with the weight of the platform in the deployed position thereof being supported solely by the traction frame of the mower, and wherein the floor further comprises:

(a) a central portion that is large enough to simultaneously support both feet of the standing operator thereon in a support plane that allows the operator's feet to be substantially level with one another when the operator is operating the mower on a level surface; and
(b) side portions on either side of the central portion with each side portion forming a foothold that is in addition to the central portion of the floor, wherein one side portion of the floor will be uphill and the other side portion of the floor will be downhill when the mower is travelling along a side of a hill rather than when the mower is travelling directly up and down the hill, and wherein the side portions are inclined relative to the support plane defined by the central portion of the floor in such a way that the downhill side portion will be more horizontal when the mower is traversing along the side of the hill than when the mower is operating on a level surface to permit the operator in this instance to shift his or her downhill foot to rest atop the downhill side portion rather than on the central portion to allow the operator to stand more comfortably on the floor than if the downhill side portion were absent.

* * * * *